US008850487B2

(12) United States Patent
Kang et al.

(10) Patent No.: US 8,850,487 B2
(45) Date of Patent: Sep. 30, 2014

(54) DISPLAY DEVICE AND METHOD FOR PROVIDING CONTENT USING THE SAME

(75) Inventors: Baeguen Kang, Pyeongtaek-si (KR); Sungbeen Han, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 13/422,156

(22) Filed: Mar. 16, 2012

(65) Prior Publication Data

US 2013/0133013 A1 May 23, 2013

(30) Foreign Application Priority Data

Nov. 18, 2011 (KR) .................. 10-2011-0121114

(51) Int. Cl.
*H04N 5/445* (2011.01)
*H04N 21/472* (2011.01)
*H04N 21/482* (2011.01)

(52) U.S. Cl.
CPC ..... *H04N 21/47205* (2013.01); *H04N 21/4828* (2013.01)
USPC .............................. 725/53; 725/93; 709/219

(58) Field of Classification Search
USPC ................... 725/37–61, 87, 91–93, 114–116; 709/217–232
See application file for complete search history.

(56) References Cited

U.S. PATENT DOCUMENTS

| 6,005,565 | A | * | 12/1999 | Legall et al. ................... 715/721 |
| 6,046,774 | A | * | 4/2000 | Heo et al. .................. 375/240.16 |
| 7,165,098 | B1 | * | 1/2007 | Boyer et al. ................... 709/219 |
| 8,339,515 | B2 | * | 12/2012 | Kondo et al. ................. 348/588 |

FOREIGN PATENT DOCUMENTS

| KR | 10-2005-0061534 A | 6/2005 |
| KR | 10-0654445 B1 | 12/2006 |
| KR | 10-2009-0081414 A | 7/2009 |

OTHER PUBLICATIONS

International Search Report and Written Opinion dated Nov. 1, 2012 issued in Application No. PCT/KR2012/001640.

* cited by examiner

*Primary Examiner* — Annan Shang
(74) *Attorney, Agent, or Firm* — Ked & Associates, LLP

(57) ABSTRACT

A display device and a method for providing content using the display device are disclosed. A controller receives a search term and searches for at least one content including a video frame associated with the received search term. A display displays a list of the searched content.

19 Claims, 18 Drawing Sheets

DISPLAY DEVICE AND METHOD FOR PROVIDING CONTENT USING THE SAME

This application claims the benefit of Korean Patent Application No. 10-2011-0121114, filed on Nov. 18, 2011, which is hereby incorporated by reference as if fully set forth herein.

BACKGROUND OF THE INVENTION

1. Field of the Invention

The present invention relates to a display device and a method for providing content using the same and more particularly, to a display device and a method for providing content using the same which can receive, store, edit and reproduce content.

2. Discussion of the Related Art

Display devices have, for example, a function for receiving and processing a broadcast image viewable by a user. Such a display device may display a broadcast, which is selected by the user from among broadcast signals transmitted from a broadcast station, on a display. Currently broadcasters are transitioning from analog broadcasting to digital broadcasting.

Digital broadcasting refers to broadcasting of transmitting digital audio and video signals. Digital broadcasting has low data loss due to robustness against external noise, favorable error correction, high resolution and high-definition screen, as compared with analog broadcasting. In addition, digital broadcasting may provide a bidirectional service unlike analog broadcasting.

To enable utilization of digital broadcasting, multimedia devices have been developed to have higher performance and a greater number of functions than conventional multimedia devices and in turn, services available to the multimedia devices have been diversified into Internet services, Video On Demand (VOD), electronic album services, and the like.

Conventional display devices provide content retrieval based only on character information and therefore, retrieval of a video frame related to desired content requires a user to directly see and hear reproduced video and audio content.

SUMMARY OF THE INVENTION

Accordingly, the present invention is directed to a display device and a method for providing content using the same that substantially obviate one or more problems due to limitations and disadvantages of the related art.

One object of the present invention is to provide a display device and a method for providing content using the same which can search for a video frame and audio contained in content.

Another object of the present invention is to provide a display device and a method for providing content using the same which can search for a video frame and audio contained in content that is stored in another device.

A further object of the present invention is to provide a display device and a method for providing content using the same which provide a user interface to assist in easily checking search results of a searched video frame and audio and easily selecting and editing the searched video frame and audio.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing content using a display device, includes receiving a user input, searching for at least one content including a video frame associated with a search term included in the received user input, and displaying a list of the searched content.

The method may further include editing content included in the list of the searched content. The editing may include at least one of the following steps, replacing a video frame of the content with another video frame, dubbing voice to the content, varying a voice level of at least a part of audio data included in the content, and replacing at least a part of audio data included in the content with previously stored audio data.

The content may be stored in at least one of a global resource and a local resource.

The displayed list may include a thumbnail with respect to the video frame.

The method may further include detecting a user action of selecting the thumbnail, and displaying a video frame associated with the selected thumbnail.

The method may further include detecting a user action of selecting content included in the list, and displaying a thumbnail of a video frame associated with the search term among video frames included in the content.

The searching for the content may include searching for the vide frame associated with the search term using a content information database including image information with respect to the video frame included in the content.

The method may further include constructing the content information database.

The constructing may include accessing content, extracting a video frame included in the accessed content, checking whether or not the extracted video frame satisfies requirements of a key frame, selecting the video frame as the key frame if the video frame satisfies the requirements of the key frame, and producing image information associated with the selected video frame.

The producing image information may include producing image information using information included in a visual descriptor of the content.

The content information database may further include position information of the video frame and information to associate the position information of the video frame with the image information.

The image information may include at least one of characteristics information on the video frame, subjective information on the video frame and expository information on the video frame.

In accordance with another aspect, a display device includes a controller to receive a search term and search for at least one content including a video frame associated with the received search term, and a display to display a list of the searched content.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
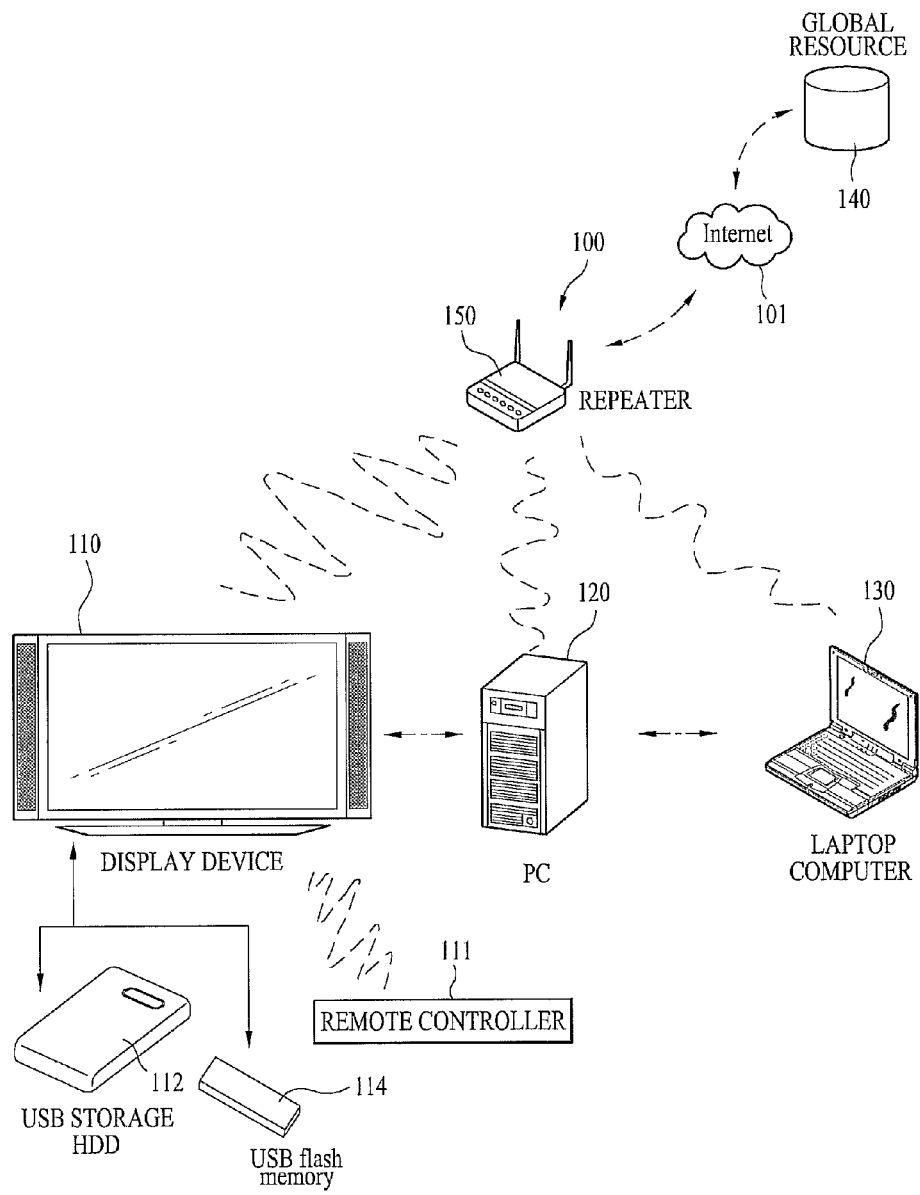
FIG. 1 is a view illustrating the configuration of a multimedia system in accordance with an exemplary embodiment of the present invention.

Exemplary embodiments of the present invention that can embody the above described objects will be described with reference to the attached drawings. Here, it should be understood that configurations and operations of the present invention that are illustrated in the drawings and explained in conjunction with the illustration are merely described as at least one embodiment and the technical ideas and essential configurations and operations of the present invention are not limited by the description.

Although the terms used in the present invention are selected from generally known and used terms in consideration of functions thereof in the present invention, these terms may vary according to intentions of those who skilled in the art, usual practice or advent of novel technologies. Furthermore, the terms may be selected at the discretion of the applicant in special cases and in this case, the detailed meanings of these terms are described in relevant parts of the description herein. Accordingly, the terms used herein should be understood not simply by the actual terms used but by the meaning lying within and the description disclosed herein.

FIG. 1 is a view illustrating the configuration of a multimedia system in accordance with an exemplary embodiment of the present invention.

Referring to FIG. 1, the multimedia system 100 in accordance with the present invention may include a display device 110, external resources 112, 114, 120, 130 and 140, and a repeater 150. The external resources 112, 114, 120, 130 and 140 may be divided into a global resource 140 and local resources 112, 114, 120 and 130.

The global resource 140 is a server located on a Wide Area Network (WAN). The global resource 140 may provide the display device 110 with an Internet service and a broadcast service. The internet service refers to a service provided via the Internet, such as a Content on Demand (CoD) service, a YouTube service, an information service for providing weather, news and local information and enabling information retrieval and the like, an entertainment service related to gaming, singing and the like, and a communication service related to TV mail and TV Short Message Service (SMS) services and the like. The broadcast service may include an IPTV broadcast service.

Of the local resources 112, 114, 120 and 130, information communication appliances 120 and 130 are provided with a memory and may implement a network function, examples of which may include a Home server, a PC, a laptop computer, a cellular phone and a Personal Digital Assistant (PDA), and the like. Also, external storage media, including a USB external hard disc 112 and a USB flash memory 114, is connected to the display device 110 via a serial bus interface. In one example, a plurality of components including the display device 110 and the external resources 112, 114, 120, 130 and 140 may be provided to constitute a single home network. The local resources 120 and 130 may be replaced by the display devices 110.

The multimedia system 100 in accordance with the present invention further includes a remote controller 111, which can send and receive data to or from the display device 110 in a wired or wireless manner. A user may control the display device 110 via the remote controller 111 in a wired or wireless manner.

The display device 110 may be directly connected to the local resources 120 and 130 in a wired or wireless manner according to standard protocol communication, or may be connected to the local resources 120 and 130 via the repeater 150. The repeater 150 serves to relay data sending/reception between the display device 110 and the local resources 120 and 130. The display device 110 may adopt standard protocol communication, such as IEEE802.11, IEEE802.11n, IEEE802.11g, IEEE802.15.4, WiFi, Ethernet, WCDMA, GRS, and the like. The display device 110 may receive content from the local resources 120 and 130 using Digital Living Network Alliance (DLNA) and may display the received content.

The display device 110 may receive an Internet service and a broadcast service from the global resource 140. In one example, the display device 110 may receive streaming data including content data from the global resource 140 and may display the content data included in the received streaming data.

Figure 2:
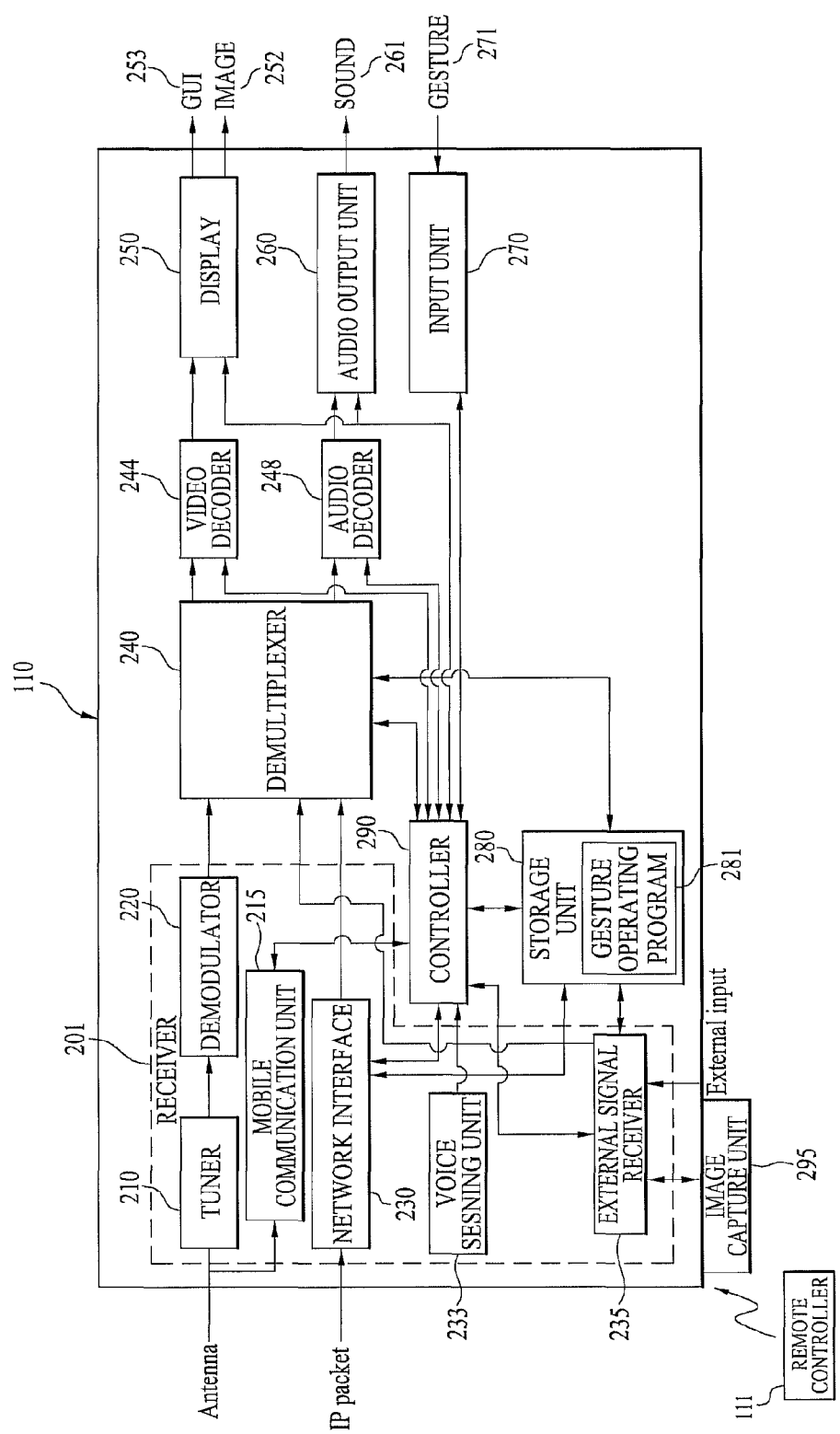
FIG. 2 is a block diagram illustrating the configuration of a display device in accordance with an exemplary embodiment of the present invention.

FIG. 2 is a block diagram illustrating the configuration of a display device in accordance with an exemplary embodiment of the present invention.

Referring to FIG. 2, the display device 110 in accordance with the present invention may include a receiver 201, a demultiplexer 240, a video decoder 244, an audio decoder 248, a display 250, an audio output unit 260, an input unit 270, a storage unit 280 and a controller 290. In some embodiments, the display device 110 may include an image capture unit 295.

The receiver 201 may receive broadcast data, video data, audio data, information data, and applications. The receiver 201 may include a tuner 210, a demodulator 220, a mobile communication unit 215, a network interface 230, a voice sensing unit 233 and an external signal receiver 235. The tuner 210 may receive applications via a broadcast network, and the mobile communication unit 215 may receive applications via a mobile communication network, such as 2G, 3G and 4 G communication networks, etc. The network interface 230 may receive applications and content from the global resource 140 and the local resources 120 and 130, and the external signal receiver 235 may receive applications and content from the local resources 112, 114, 120 and 130.

The demultiplexer 240 serves to demultiplex a stream signal output from the demodulator 220 into video and audio signals. Additionally, the demultiplexer 240 may receive video data, audio data, broadcast data, information data and application data from the mobile communication unit 215, the network interface 230 and the external signal receiver 235.

The video decoder 244 implements decoding the demultiplexed video signal from the demultiplexer 240 and outputs a decoded video signal to the display 250.

The audio decoder 248 implements decoding the multiplexed audio signal from the demultiplexer 240 and outputs a decoded audio signal to the audio output unit 260.

The display 250 serves to display the image 252. The display 250 may be operated in connection with the controller 290. The display 250 may display a Graphical User Interface (GUI) 253, which provides an interface for allowing the user to easily access an operating system (OS) of the display device or an application that is being executed on the operating system.

The audio output unit 260 may receive audio data from the audio decoder 248 and the controller 290 and output the sound 261 via reproduction of the received audio data. In some embodiments, the sound 261 may be voice, the tone of which is modulated according to a voice tone setting value. In some embodiments, the sound 261 may be sound sensed by the voice sensing unit 233 during display of the image 252, other than sound of an audio signal decoded by the audio decoder 248.

The input unit 270 may be a touch screen which is arranged on the display 250 or at the front of the display 250, or may be a communication unit which receives a signal from a remote controller. The input unit 270 may receive a remote controller transmission signal from the remote controller 111.

In some embodiments, the receiver 201 may be a communication unit to receive a signal from the remote controller 111. Specifically, the external signal receiver 235 may receive the remote controller transmission signal from the remote controller 111. The remote controller transmission signal may contain content data, and the display device 110 in accordance with the present invention may receive content contained in the remote controller transmission signal.

The storage unit 280 generally provides a location where program code and data to be used by the display device 110 are stored. The program code may be program code of an application that the receiver 201 receives and program code of an application previously stored upon manufacture of the display device 110. The application may be programmed in programming languages, such as HTML, XML, HTML5, CSS, CSS3, JavaScript, Java, C, C++, Visual C++, c#, etc.

The storage unit 280 may store a content information database and a voice tone setting value. The content information database may store content identifiers to identify content, content position information to indicate an address where content is stored, content image information and information to associate the position information with the image information. The image information may include a thumbnail with respect to a scene included in an image, information on a position of a scene, objective and subjective information on a scene and expository information on a scene. The scene may be organized by a single video frame or one or more video frames, and the objective information on the scene may refer to characteristic information on the scene.

The storage unit 280 may be implemented as a Read-Only Memory (ROM), a Random Access Memory (RAM), a hard disk drive, or the like. The program code and data may be stored in a separable storage medium and may be loaded or installed onto the display device 110 as necessary. The separable storage medium may include a CD-ROM, a PC-CARD, a memory card, a floppy disk, a magnetic tape and a network component.

The controller 290 serves to execute an instruction and implement an operation associated with the display device 110. For example, the controller 290 may control reception and processing of input and output between components of the display device 110 and data reception and processing, using an instruction searched from the storage unit 280.

The controller 290 further serves to execute program code together with an operating system and to produce and use data. The operating system is generally known and therefore, a detailed description thereof is omitted. An example of the operating system may include Windows OS, Unix, Linux, Palm OS, DOS, Android, and Mac OS. The operating system, other computer code and data may be present within the storage unit 280 which is operated in connection with the controller 290.

The controller 290 may be implemented on a single chip, a plurality of chips, or a plurality of electric components. For example, a variety of architectures, including a dedicated or embedded processor, a single purpose processor, a controller, an Application Specific Integrated Circuit (ASIC), etc., may be used with respect to the controller 290.

The controller 290 may recognize a user action and may control the display device 110 based on the recognized user action. The user action may include selection of a physical button on the display device or the remote controller, execution of a prescribed gesture or selection of a soft button on a touch screen display, execution of a prescribed gesture recognized from an image captured through an image capture unit, and production of prescribed sound recognized by sound recognition. The gesture may include a touch gesture and a spatial gesture.

The input unit 270 receives a gesture 271, and the controller 290 executes instructions to implement operations associated with the gesture 271. Additionally, the storage unit 280 may contain a gesture operating program 281, which may be a part of an operating system or a separate application. The gesture operating program 281 generally contains a series of instructions for recognizing occurrence of the gesture 271 and informing one or more software agents of the gesture 271 and/or which actions should be taken in response to the gesture 271.

Figure 3:
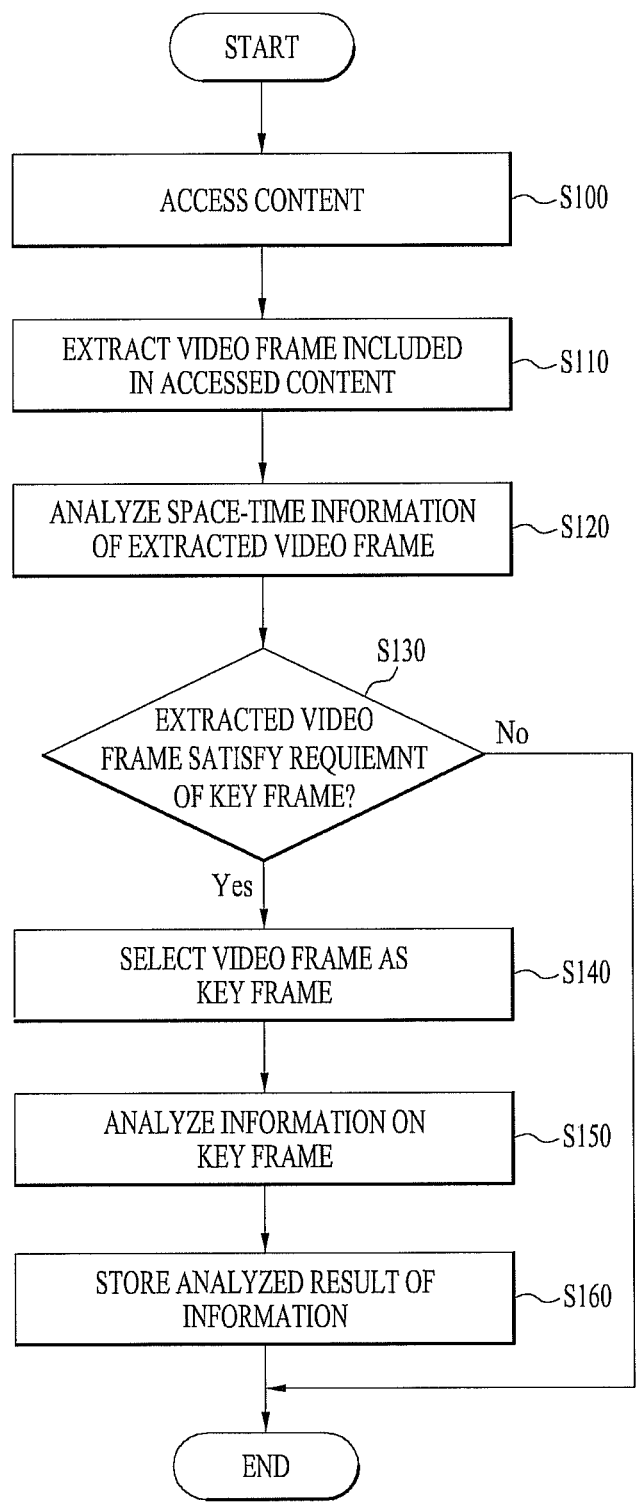
FIG. 3 is a flowchart illustrating the implementation procedure of a method for constructing a content information database in accordance with an exemplary embodiment of the present invention.

FIG. 3 is a flowchart illustrating the implementation procedure of a method for constructing a content information database in accordance with an exemplary embodiment of the present invention.

Referring to FIG. 3, the controller 290 controls access to content (S100). The content may be stored in the storage unit 290 and the external resources 112, 114, 120, 130 and 140. The content may be transmitted from the global resource 140 by streaming. Operation S100 may be automatically implemented after booting, may be periodically implemented, or may be implemented upon user request. Additionally, operation S100 may be automatically implemented when content data is transmitted from the global resource 140 by streaming.

The controller 290 extracts a video frame contained in the accessed content (S110). The controller 290 may extract I-frame, B-frame and even P-frame.

The controller 290 analyzes space-time information on the extracted video frame (S120). The controller 290 may analyze space-time information on the video frame using information contained in a visual descriptor that is defined by Moving Picture Experts Group (MPEG) 7.

The controller 290 checks whether or not the extracted video frame satisfies requirements of a key frame (S130). The requirements of the key frame may include a requirement that the key frame correspond to a video frame of a portion where scene change occurs. That is to say, the controller 290 may check whether or not an extracted video frame is a video frame of a portion where scene change occurs. In some embodiments, the controller 290 may check whether or not a video frame is a video frame of a portion where scene change occurred using space-time information on the video frame analyzed in operation S120. In some embodiments, the controller 290 may calculate a change rate by comparing a current video frame with a previous video frame and may select a video frame 500 as a key frame if the calculated change rate is 50% or more.

If a video frame satisfies the requirements of a key frame, the controller 290 selects the video frame as the key frame (S140).

The controller 290 analyzes information on the video frame that is selected as the key frame (S150). The controller 290 may analyze information on the video frame using information contained in a visual descriptor that is defined by MPEG 7. The analyzed information may be image information. In some embodiments, operation S150 may include the implementation procedure of a method for analyzing information on a video frame of FIG. 4.

The controller 290 stores the information analyzed in operation S150 (S160). The information may be stored in the storage unit 280, and may be stored in the external resources 112, 114, 120, 130 and 140. Additionally, the information may be included in the content information database. The controller 290 may store information on content accessed in operation S100, such as content identifiers, content position information and information to associate the content identifiers with the content position information.

The content information database may index and store the information that is analyzed on a per key frame basis in operation 150. In some embodiments, the information analyzed in operation S150 may be indexed and stored based on characters as an index key, the characters being one of information included in the analyzed information of operation 150.

Figure 4:
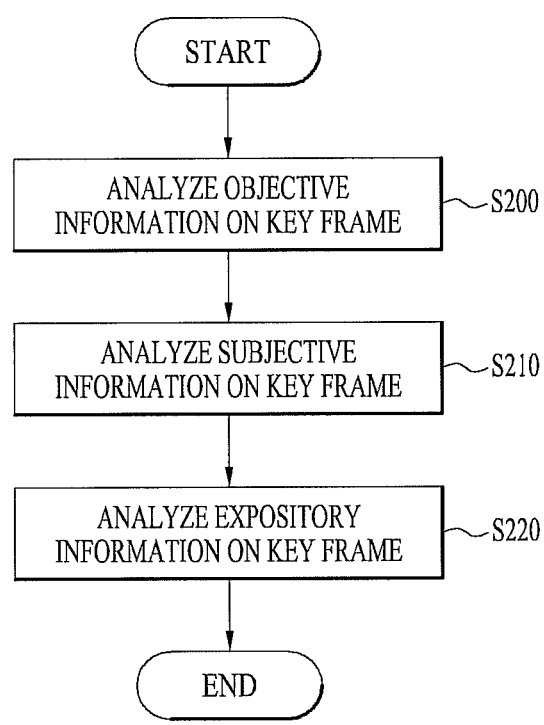
FIG. 4 is a flowchart illustrating the implementation procedure of a method for analyzing information on a video frame in accordance with an exemplary embodiment of the present invention.

FIG. 4 is a flowchart illustrating the implementation procedure of a method for analyzing information on a video frame in accordance with an exemplary embodiment of the present invention.

Referring to FIG. 4, the controller 290 analyzes objective information on a key frame (S200). The objective information includes characteristic values with respect to the key frame based on color, shape and pattern. In operation S200, the controller 200 extracts the characteristic values from the key frame.

The controller 290 analyzes subjective information on the key frame (S210). The subjective information is information to indicate happiness, sadness, anger, love, etc. In operation S210, the controller 290 determines the subjective information represented by the key frame.

The controller 290 analyzes expository information on the key frame (S220). The expository information includes expository information on events, actions and comments related to a video frame and information on characters included in a video frame. In operation S220, the controller 290 detects the expository information on the key frame.

Figure 5:
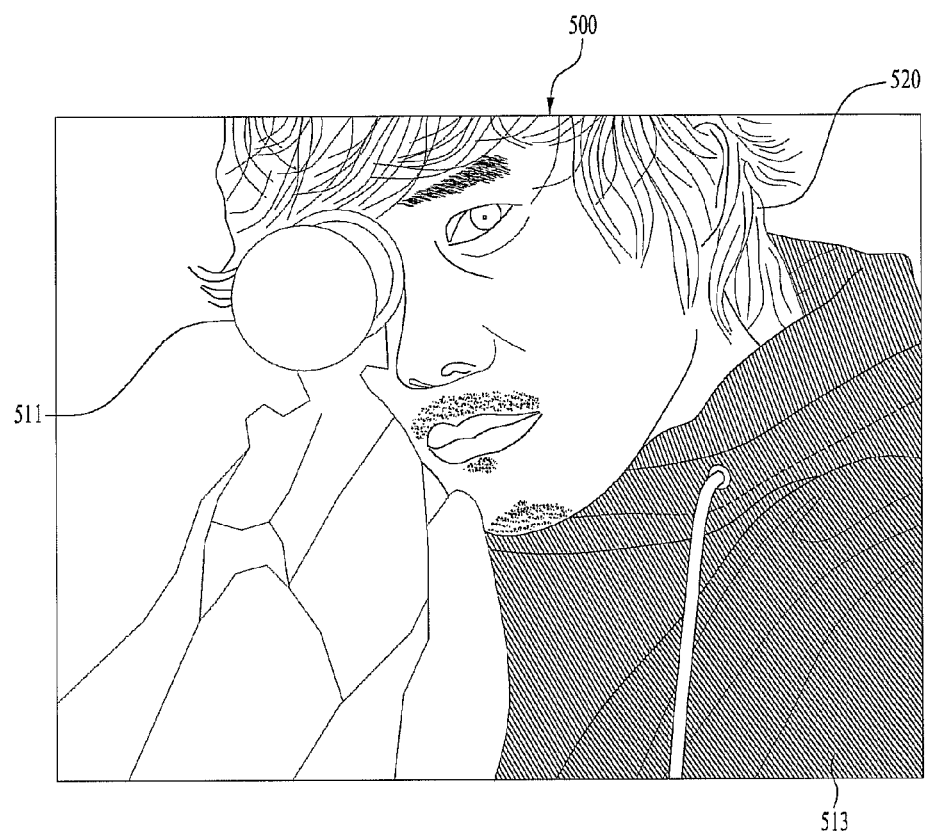
FIG. 5 is a view illustrating an exemplary embodiment of a video frame.

FIG. 5 is a view illustrating an exemplary embodiment of a video frame.

Referring to FIG. 5, the controller 290 may extract a video frame 500 from content. Then, the controller 290 may check whether or not the video frame 500 is a video frame of a portion where scene change occurs and based on the checked results, may select the video frame 500 as a key frame. The controller 290 may calculate a change rate by comparing the video frame 500 with a previous video frame and may select the video frame 500 as a key frame if the calculated change rate is 50% or more.

The controller 290 extracts objective information, such as characteristic values representing a circular collimator 511, a black garment 513 and the like, from the key frame 500. Additionally, the controller 290 determines the key frame 500 as indicating sadness based on subjective information on the key frame 500. The controller 290 may extract the subjective information from an MPEG 7 visual descriptor.

The controller 290 detects expository information on the key frame 500, such as the name of a character 520 "LEE BYEONGHEON", action of the character 520 "Shooting" and the name of content containing the key frame 500 "IRIS".

Figure 6:
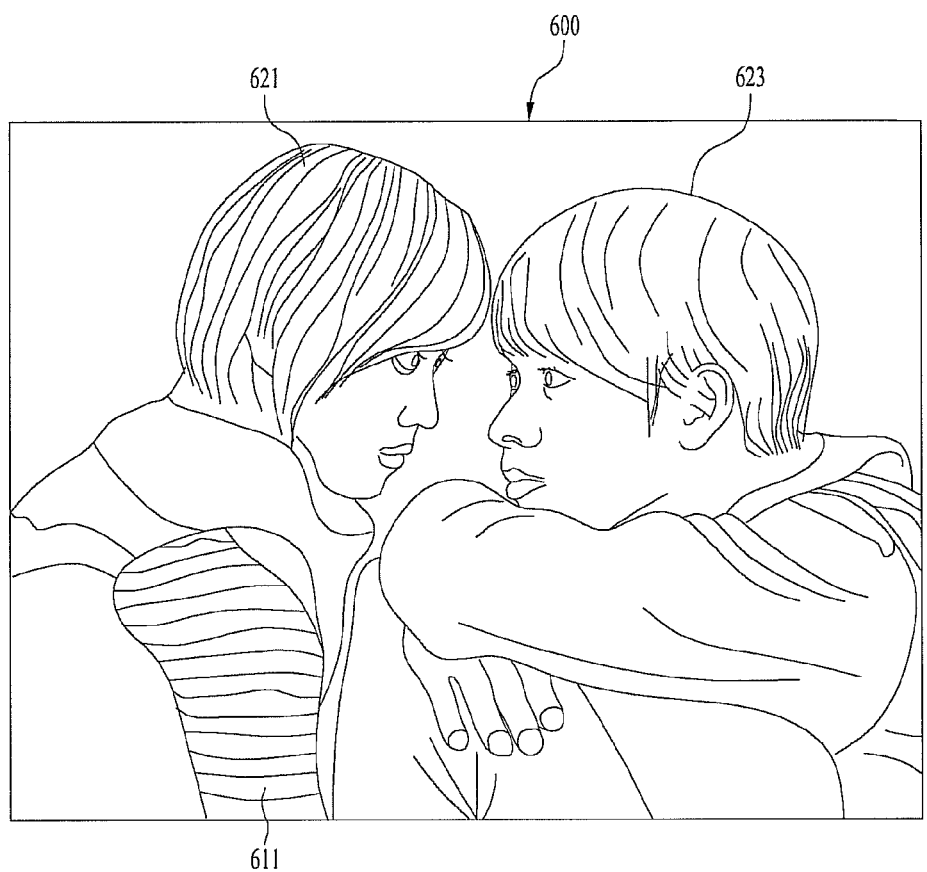
FIG. 6 is a view illustrating another exemplary embodiment of a video frame.

FIG. 6 is a view illustrating another exemplary embodiment of a video frame.

Referring to FIG. 6, the controller 290 may extract a video frame 600 from content. Then, the controller 290 may check whether or not the video frame 600 is a video frame of a portion where scene change occurs and based on the checked results, may select the video frame 600 as a key frame. The controller 290 may calculate a change rate by comparing the video frame 600 with a previous video frame and may select the video frame 600 as a key frame if the calculated change rate is 50% or more.

The controller 290 extracts objective information, such as characteristic values representing black/white stripes 611 and the like, from the key frame 600. Additionally, the controller 290 determines the key frame 600 as indicating love based on subjective information on the key frame 600. The controller 290 may extract the subjective information from an MPEG 7 visual descriptor.

The controller 290 detects expository information on the key frame 600, such as the name of a character 621 "HA GEE WON", the name of a character 623 "HYUN BIN", action of the character 623 "Sit-ups", the background of the video frame 600 "Gymnasium" and the name of content containing the key frame 600 "SECRET GARDEN".

Figure 7:
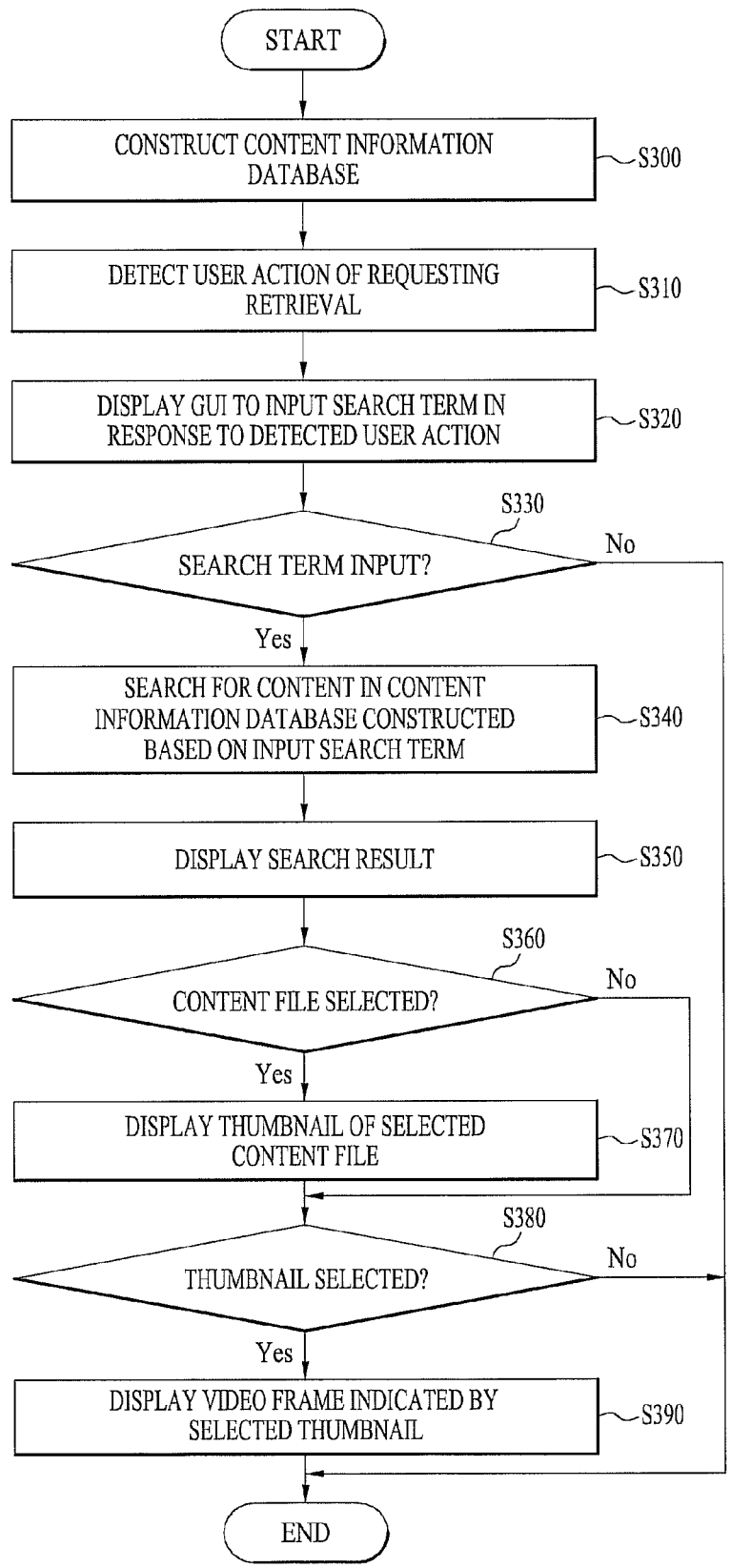
FIG. 7 is a flowchart illustrating the implementation procedure of a method for providing content in accordance with an exemplary embodiment of the present invention.

FIG. 7 is a flowchart illustrating the implementation procedure of a method for providing content in accordance with an exemplary embodiment of the present invention.

Referring to FIG. 7, the controller 290 constructs a content information database (S300). Operation S300 may include the implementation procedure of the method for constructing a content information database of FIG. 3.

The controller 290 detects a user action of requesting retrieval (S310).

In response to the detected user action, the controller 290 may control display of a GUI to input a search term (S310). The GUI may be displayed to overlay a broadcast screen, or may be displayed over the entire screen.

Figure 8:
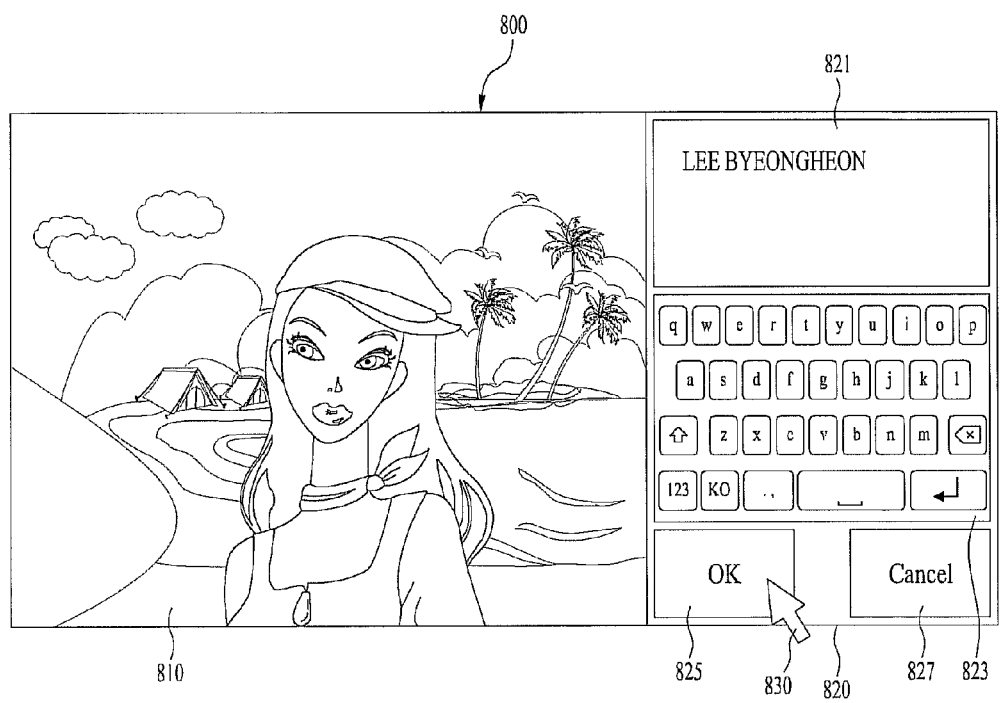
FIG. 8 is a view illustrating an exemplary embodiment of a screen on which a GUI to input a search term is displayed.

FIG. 8 is a view illustrating an exemplary embodiment of a screen on which a GUI to input a search term is displayed.

Referring to FIG. 8, the display 250 may display a screen 800 in operation S310. The screen 800 includes an image region 810 and a GUI region 820. The image region 810 displays a currently displayed image and the GUI region 820 displays a GUI to input a search term.

The GUI region 820 includes a search term input window 821, an imaginary keypad 823, an 'OK' button 825 and a 'Cancel' button 827. The user may input a search term using the imaginary keypad 823, and the input search term is displayed on the search term input window 821. The search term input window 821 displays a currently input search term "LEE BYEONGHEON". The user may request retrieval using the search term input into the search term input window 821 by pressing the 'OK' button 825, and may cause the GUI region 820 to disappear by pressing the 'Cancel' button 827 without retrieval. Additionally, the user may press buttons of the imaginary keypad 823, the 'OK' button 825 and the 'Cancel' button 827 using a pointer 830.

The controller 290 checks whether or not the search term is input (S330). In some embodiments, in the case in which the 'OK' button 825 illustrated in FIG. 8 is pushed, the controller 290 confirms that the search term displayed on the search term input window 821 is input.

If the search term is input, the controller 290 searches for content from the content information database that is constructed based on the input search term (S340). The controller 290 searches for content including a video frame associated with the search term by comparing image information included in the content information database with the input search term. That is to say, the controller 290 searches for a video frame containing image information equal or similar to the input search term.

For example, if the input search term is "LEE BYEONGHEON", the controller 290 may search for image information including "LEE BYEONGHEON" from the content information database and may detect video frames containing the image information. If the input search term is "scene in IRIS where LEE BYEONGHEON, who wears a black garment, shoots with a sad expression", the controller 290 may search for image information including the collimator, black garment, sadness, LEE BYEONGHEON, shooting and IRIS from the content information database, and may detect the video frame 500 of FIG. 5 containing the searched image information. In addition, if the input search term is "scene in SECRET GARDEN where HYUN BIN, who wears black training clothes, is performing sit-ups together with lovely HA GEEWON in a gymnasium", the controller 290 may search for image information including black/white stripes, love, HA GEE WON, HYUN BIN, gymnasium and SECRET GARDEN and may detect the video frame 600 of FIG. 6 including the searched image information.

The controller 290 displays the search results (S350). The search results may be displayed to overlay a broadcast screen, or may be displayed over the entire screen.

Figure 9:
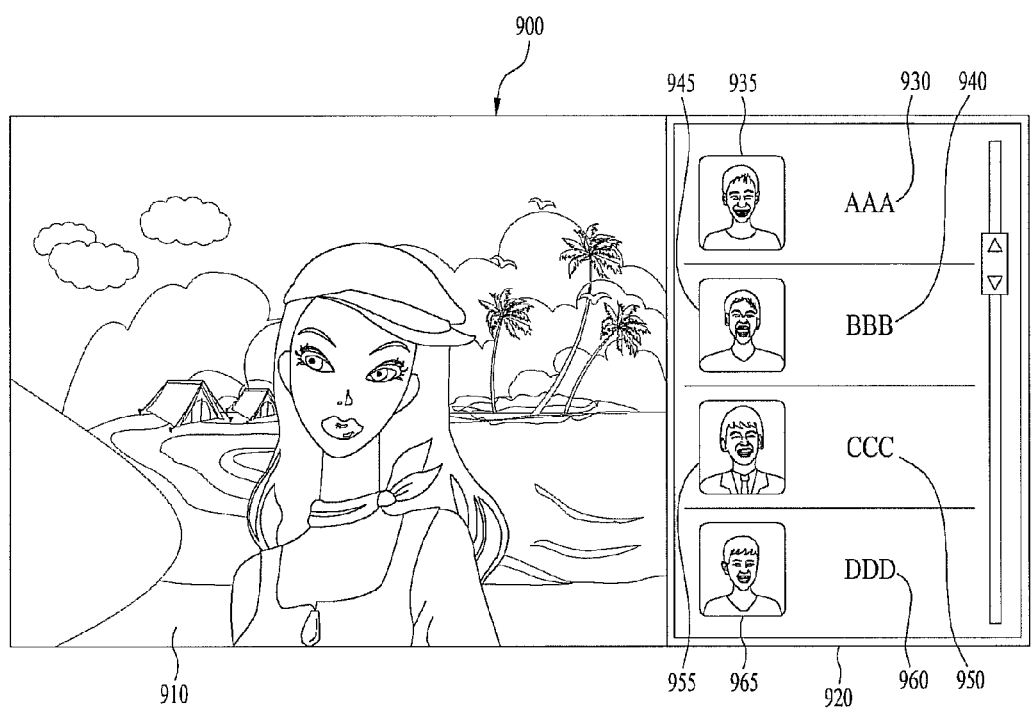
FIG. 9 is a view illustrating an exemplary embodiment of a screen on which search results are displayed.

FIG. 9 is a view illustrating an exemplary embodiment of a screen on which search results are displayed.

Referring to FIG. 9, the display 250 may display a screen 900 in operation S350. The screen 900 includes an image region 910 and a search results region 920. The image region 910 displays a currently displayed image and the search results region 920 displays the search results.

The search results region 920 displays content 930, 940, 950 and 960 and thumbnails 935, 945, 955 and 965 of content, which are searched for based on the search term. The content 930, 940, 950 and 960 may be content identifiers (for example, file names or titles). That is to say, 'AAA' designated by reference numeral 930 may be the file name of content.

The thumbnails 935, 945, 955 and 965 may be thumbnails of video frames associated with the search term. That is to say, the thumbnails 935, 945, 955 and 965 may be produced by reducing the associated video frames, and may be produced to contain specific objects included in the associated video frames.

In the case in which a plurality of video frames associated with a search term is present in single content, the controller 290 may select a representative video frame among the plurality of video frames and may control display of a thumbnail of the selected representative video frame in the search results region 920. For example, the 'AAA' 930 may include a plurality of video frames associated with the input search term of FIG. 8, and the thumbnail 935 may be a thumbnail of a firstly displayed video frame among the video frames or a thumbnail of a video frame having the greatest association with the search term.

The controller 290 checks whether or not a content file is selected (S360). In the case in which specific content among content displayed as search results is selected, the controller 290 may confirm that a content file is selected. For example, if 'BBB' designated by reference numeral 940 of FIG. 9 is selected, the controller 290 may confirm that a content file of 'BBB' is selected.

The controller 290 displays a thumbnail of the selected content file (S370). Thumbnails of video frames associated with a search term among video frames included in the selected content file may be displayed.

Figure 10:
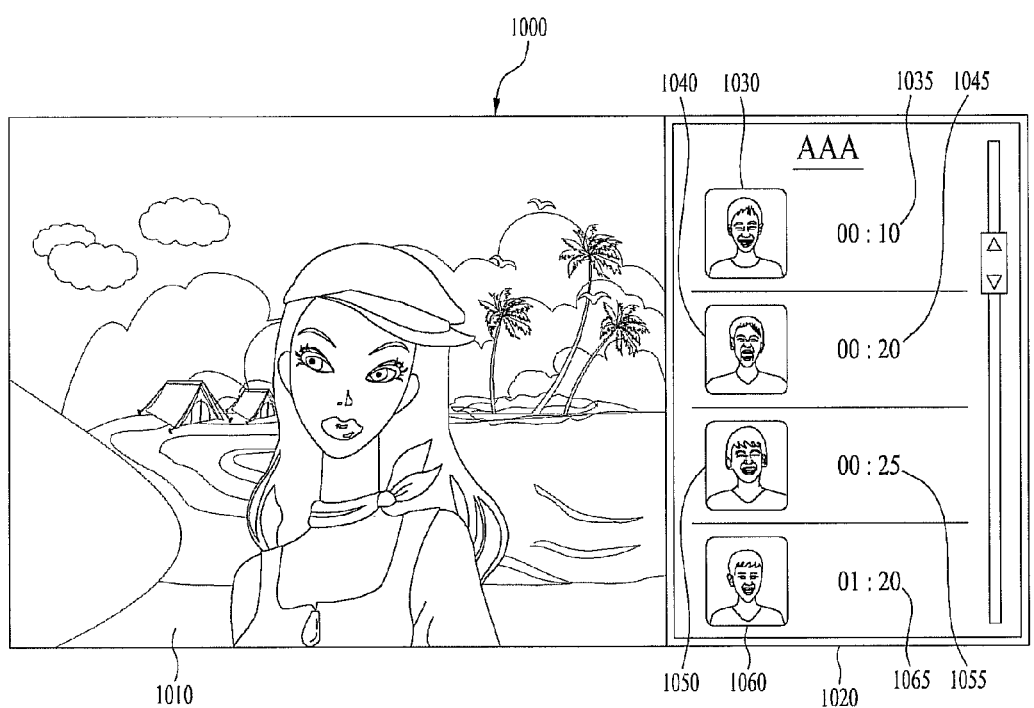
FIG. 10 is a view illustrating an exemplary embodiment of a screen on which thumbnails are displayed.

FIG. 10 is a view illustrating an exemplary embodiment of a screen on which thumbnails are displayed.

Referring to FIG. 10, in the case in which the 'AAA' 930 of FIG. 9 is selected in operation S360, the display 250 may display a screen 1000 in operation S370. The screen 1000 includes an image region 1010 and a thumbnail region 1020. The image region 1010 displays a currently displayed image, and the thumbnail region 1020 displays thumbnails 1030, 1040, 1050 and 1060 and times 1035, 1045, 1055 and 1065 when the thumbnails are displayed. The thumbnails 1030, 1040, 1050 and 1060 may be thumbnails of video frames associated with a search term among video frames included in the 'AAA' 930. For example, the thumbnail 1040 is a thumbnail of a video frame included in the 'AAA' 930, which is displayed after a display time of the 'AAA' 930, e.g., 20 minutes has passed.

The controller 290 checks whether or not a thumbnail is selected (S380). The thumbnail may be a thumbnail of the search results displayed in operation S350 or a thumbnail displayed in operation 370. For example, the controller 290 may confirm that a thumbnail is selected when the thumbnail 935 of FIG. 9 or the thumbnail 1040 of FIG. 10 is selected.

If the thumbnail is selected, the controller 290 controls display of the video frame indicated by the selected thumbnail (S390). For example, if the thumbnail 935 of FIG. 9 is selected, the controller 290 displays the video frame associated with the thumbnail 935. The 'AAA' 930 may be displayed from the video frame associated with the thumbnail 935. Additionally, if the thumbnail 1040 of FIG. 10 is selected, the controller 290 controls display of the video frame associated with the thumbnail 1040. That is to say, the 'AAA' 930 may be displayed from the video frame associated with the thumbnail 1040.

Figure 11:
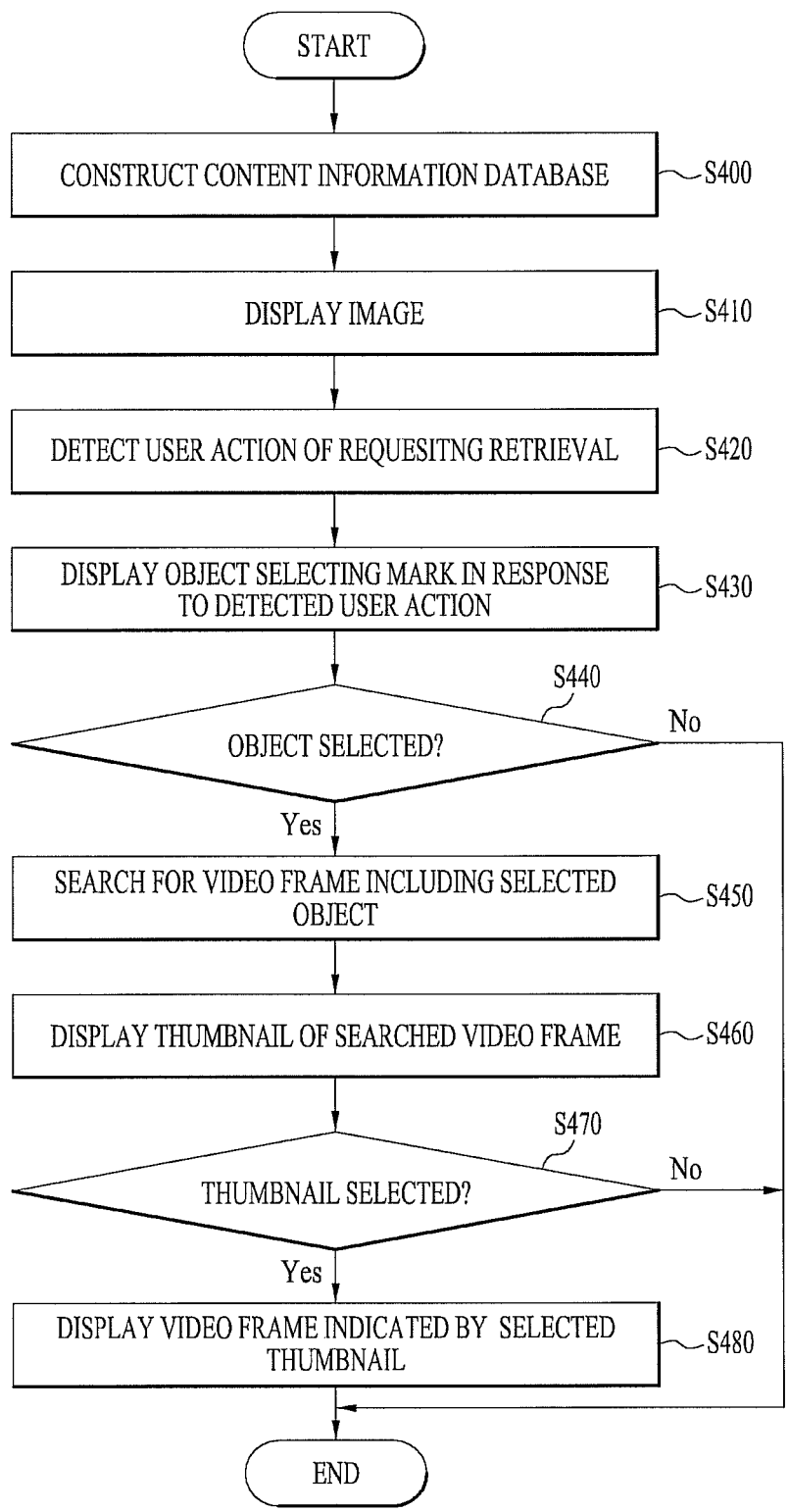
FIG. 11 is a flowchart illustrating the implementation procedure of a method for providing content in accordance with an exemplary embodiment of the present invention.

FIG. 11 is a flowchart illustrating the implementation procedure of a method for providing content in accordance with an exemplary embodiment of the present invention.

Referring to FIG. 11, the controller 290 constructs a content information database (S400). Operation S400 may include the implementation procedure of the method for constructing a content information database of FIG. 3.

The controller 290 controls display of an image (S410). The image may be an image stored in the storage unit 280, may be an image received from the external resources 112, 114, 120, 130 and 140, or may be an image received by the tuner 210.

The controller 290 detects a user action of requesting retrieval (S420).

The controller 290 controls display of an object selecting mark in response to the detected user action (S430). The object selecting mark may be used to select an object included in an image displayed in operation S420. The object may include at least one of human, animal and natural objects.

Figure 12:
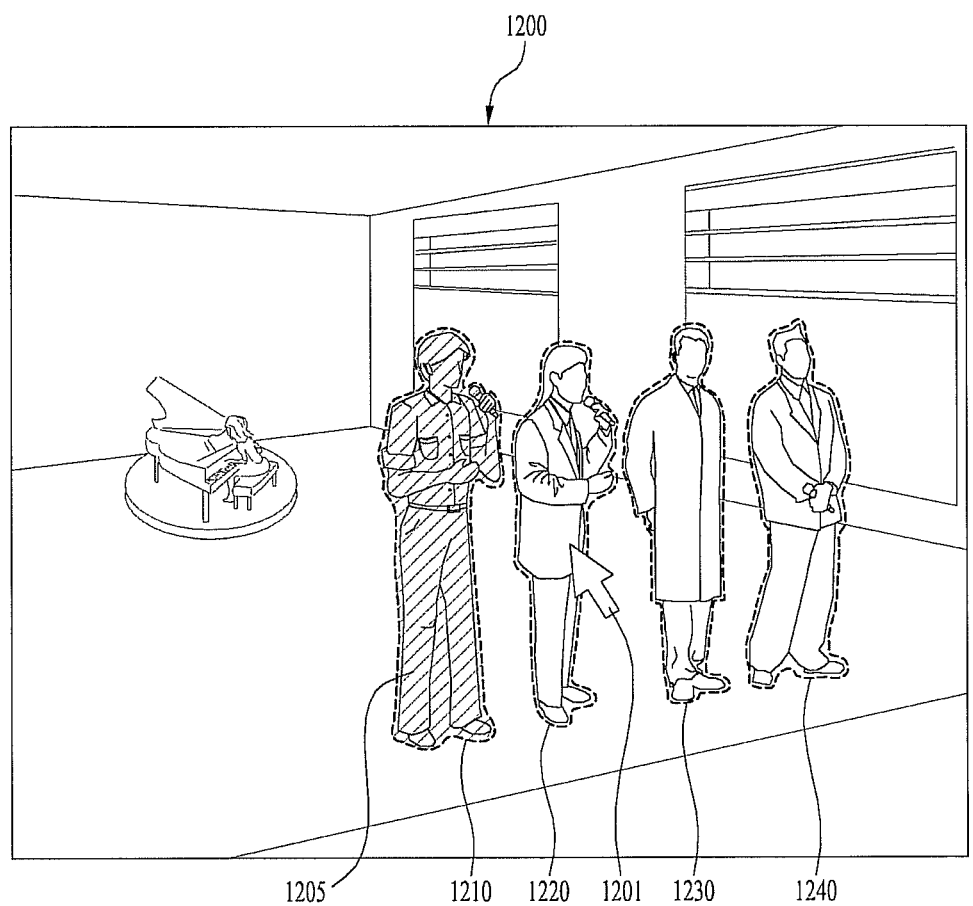
FIG. 12 is a view illustrating an exemplary embodiment of a screen on which an object selecting mark is displayed.

FIG. 12 is a view illustrating an exemplary embodiment of a screen on which an object selecting mark is displayed.

Referring to FIG. 12, the display 250 displays a screen 1200 in operation S430. The screen 1200 may include object selecting marks 1210, 1220, 1230 and 1240 to select an object included in an image. The user may select one of the object selecting marks 1210, 1220, 1230 and 1240 by locating a pointer 1201 at a region occupied by the corresponding object selecting mark and pressing a specific button (for example, a 'OK' button) on a remote controller. Alternatively, the user may select the object selecting mark using an indicator 1205.

The controller 290 checks whether or not an object is selected (S440). If one of the displayed object selecting marks is selected in operation S440, the controller 290 confirms that an object indicated by the selected object selecting mark is selected.

If the object is selected, the controller 290 searches for a video frame including the selected object among the video frames included in the image displayed in operation 410 (S450). The controller 290 may search for the video frame using the content information database constructed in operation S400.

The controller 290 controls display of a thumbnail of the searched video frame.

Figure 13:
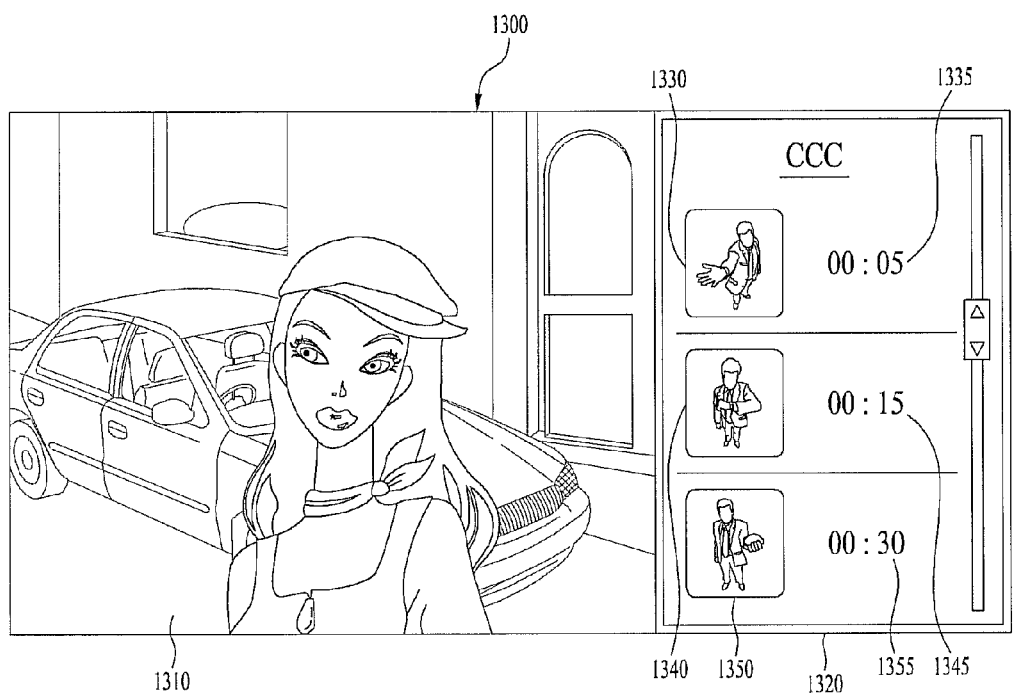
FIG. 13 is a view illustrating another exemplary embodiment of a screen on which thumbnails are displayed.

FIG. 13 is a view illustrating another exemplary embodiment of a screen on which thumbnails are displayed.

Referring to FIG. 13, the display 250 may display a screen 1300 in operation S460. The screen 1300 may include an image region 1310 and a thumbnail region 1320. The image region 1310 displays the image displayed in operation S410 and the thumbnail region 1320 displays thumbnails 1330, 1340 and 1350 of the video frames searched in operation S450. Additionally, the thumbnail region 1320 displays times 1335, 1345 and 1355 when the thumbnails are displayed. The thumbnails 1330, 1340 and 1350 may be thumbnails including the object selected in operation S440, which is included in the video frames.

The controller 290 checks whether or not a thumbnail is selected (S470). The thumbnail may be a thumbnail displayed in operation S460. For example, if the thumbnail 1330 of FIG. 13 is selected, the controller 290 may confirm that the thumbnail is selected.

If the thumbnail is selected, the controller 290 controls display of the video frame indicated by the selected thumbnail (S480). For example, if the thumbnail 1330 of FIG. 13 is selected, the controller 290 controls display of a video frame associated with the thumbnail 1330. That is to say, an image displayed on the image region 1310 is displayed from a video frame associated with the thumbnail 1330.

In some embodiments, the controller 290 may search for the video frame including the object selected in operation S450 from among video frames of content included in the content information database. In this case, operations S350 to S390 may be implemented instead of operations S460 to S480.

Figure 14:
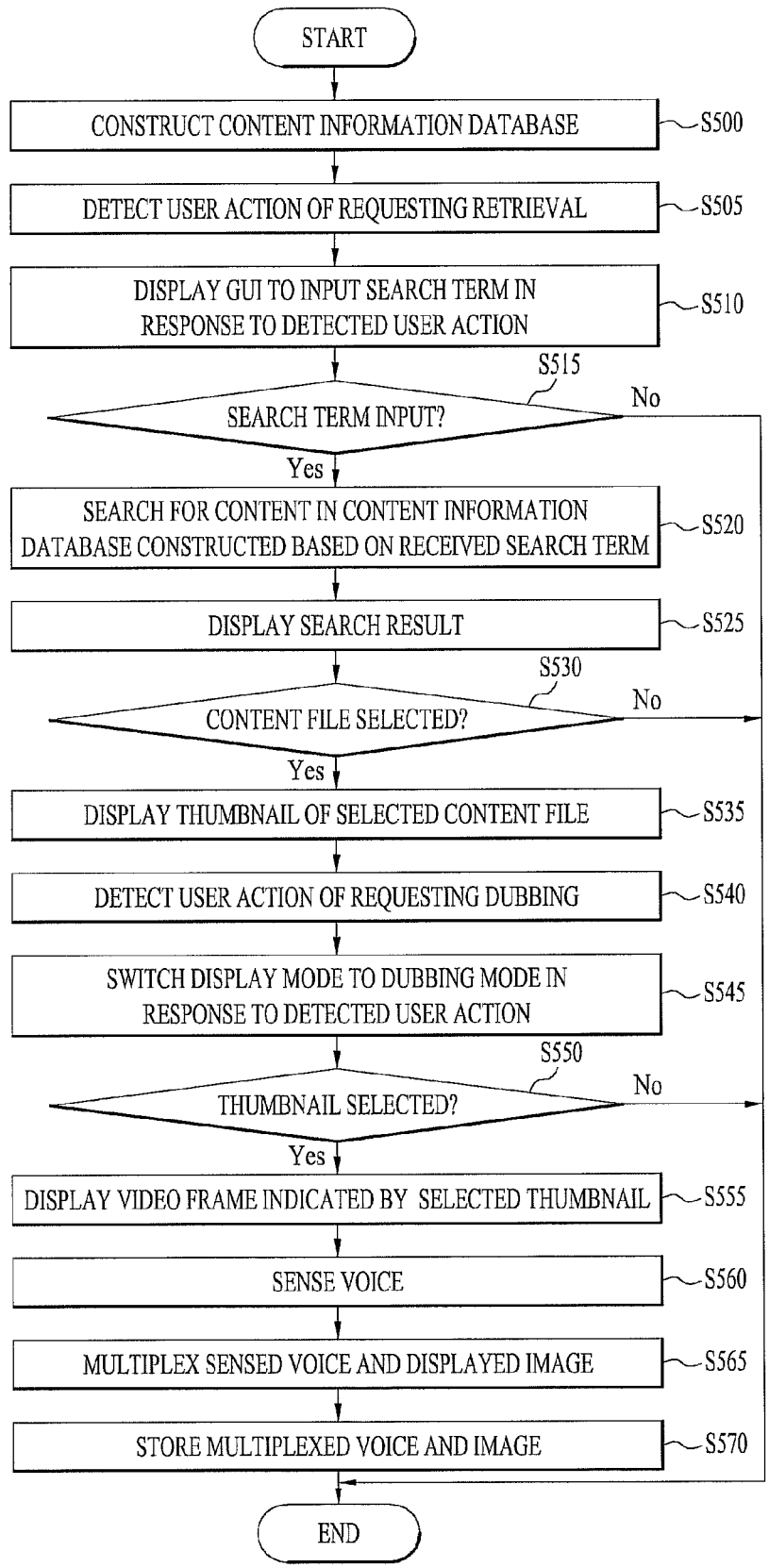
FIG. 14 is a flowchart illustrating the implementation procedure of a method for providing content in accordance with another embodiment of the present invention.

FIG. 14 is a flowchart illustrating the implementation procedure of a method for providing content in accordance with another embodiment of the present invention.

Referring to FIG. 14, the controller 290 constructs a content information database (S500). Operation S500 may include the implementation procedure of the method for constructing a content information database of FIG. 14.

The controller 290 detects a user action of requesting retrieval (S505).

The controller 290 may control display of a GUI to input a search term in response to the detected user action (S510). The GUI may be displayed to overlay a broadcast screen, or may be displayed over the entire screen. The display 250 may display the screen 800.

The controller 290 checks whether or not a search term is input (S515). In some embodiments, if the 'OK' button 825 illustrated in FIG. 8 is pressed, the controller 290 confirms that the search term displayed on the search term input window 821 is input.

If the search term is input, the controller 290 searches for content in the content information database constructed based on the input search term (S520). The controller 290 searches for content including a video frame associated with the search term by comparing image information included in the content information database with the input search term. That is to say, the controller 290 searches for a video frame having image information equal or similar to the input search term.

For example, if the input search term is "scene in IRIS where LEE BYEONGHEON, who wears a black garment, shoots with a sad expression", the controller 290 may search for image information including the collimator, black garment, sadness, LEE BYEONGHEON, shooting and IRIS from the content information database, and may detect the video frame 500 of FIG. 5 containing the searched image information. In addition, if the input search term is "scene in SECRET GARDEN where HYUN BIN, who wears black training clothes, is performing sit-ups together with lovely HA GEEWON in a gymnasium", the controller 290 may search for image information including black/white stripes, love, HA GEE WON, HYUN BIN, gymnasium and SECRET GARDEN and may detect the video frame 600 of FIG. 6 including the searched image information.

The controller 290 displays the search results (S525). The search results may be displayed to overlay a broadcast screen or may be displayed over the entire screen. The display 250 may display the screen 900.

The controller 290 checks whether or not a content file is selected (S530). If specific content among content displayed as the search results is selected, the controller 290 may confirm that a content file is selected. For example, if the 'BBB' 940 of FIG. 9 is selected, the controller 290 may confirm that a content file of the 'BBB' 940 is selected.

If the content file is selected, the controller 290 displays a thumbnail of the selected content file (S535). The thumbnails of the video frames associated with the search term among the video frames included in the selected content file may be displayed. If the 'AAA' 930 of FIG. 9 is selected in operation S530, the display 250 may display a screen 1000 in operation S535.

The controller 290 detects a user action of requesting dubbing (S540). In some embodiments, operation S540 may be implemented with operations S505 to S535 in parallel.

The controller 290 switches a display mode to a dubbing mode in response to the detected user action (S545).

The controller 290 checks whether or not a thumbnail is selected (S550). The thumbnail may be the thumbnail of the search results displayed in operation S525 or may be the thumbnail displayed in operation S535. For example, the controller 290 may confirm that the thumbnail is selected if the thumbnail 935 of FIG. 9 or the thumbnail 1040 of FIG. 10 is selected.

If the thumbnail is selected, the controller 290 controls display of a video frame indicated by the selected thumbnail (S555). For example, if the thumbnail 935 of FIG. 9 is selected, the controller 290 controls display of a video frame associated with the thumbnail 935. That is to say, the 'AAA' 930 may be displayed from the video frame associated with the thumbnail 935. If the thumbnail 1040 of FIG. 10 is selected, the controller 290 controls display of a video frame associated with the thumbnail 1040. That is to say, the 'AAA' 930 may be displayed from the video frame associated with the thumbnail 1040.

The voice sensing unit 233 senses user voice and provides the sensed voice to the controller 290 (S560).

The controller 290 multiplexes the voice sensed by the voice sensing unit 230 and the displayed image (S565). In some embodiments, the controller 290 may compress and multiplex the voice and the displayed image.

The controller 290 stores the multiplexed voice and image (S570). The multiplexed voice and image may be stored in the storage unit 280 and may be stored in the external resources 112, 114, 120, 130 and 140.

Figure 15:
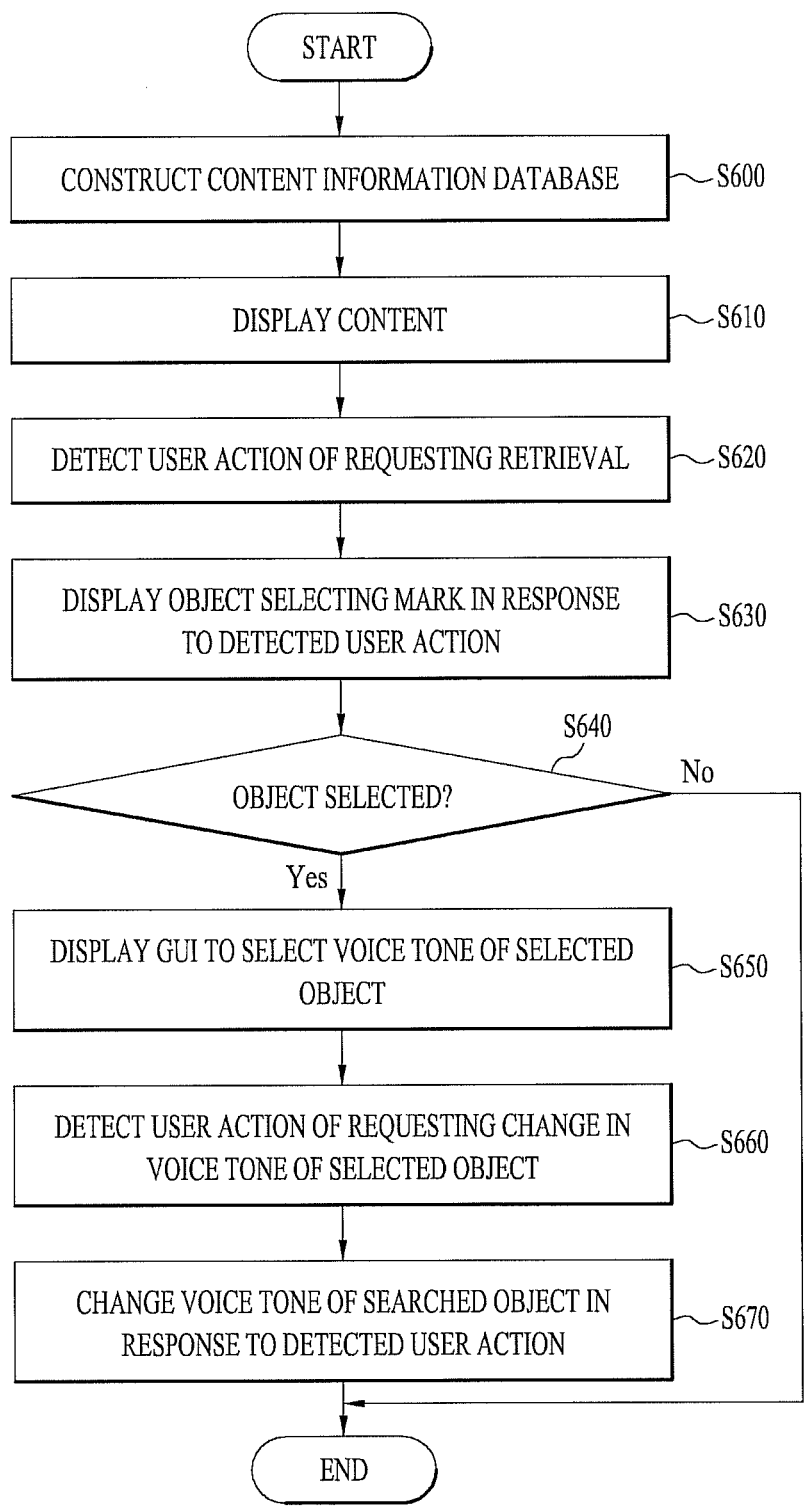
FIG. 15 is a flowchart illustrating the implementation procedure of a method for providing content in accordance with a further embodiment of the present invention.

FIG. 15 is a flowchart illustrating the implementation procedure of a method for providing content in accordance with a further embodiment of the present invention.

Referring to FIG. 15, the controller 290 constructs a content information database (S600). Operation S600 may include the implementation procedure of the method for constructing a content information database of FIG. 3.

The controller 290 controls display of content (S610). The content may be stored in the storage unit 280, may be received from the external resources 112, 114, 120, 130 and 140, or may be received by the tuner 210.

The controller 290 detects a user action of requesting retrieval (S620).

The controller 290 controls display of an object selecting mark in response to the detected user action (S630). The object selecting mark may be used to select an object included in an image of content displayed in operation S610. The object may include at least one of human, animal and natural objects. The display 250 may display a screen 1200 in operation S630.

The controller 290 checks whether or not an object is selected (S640). If one of the object selecting marks displayed in operation S640 is selected, the controller 290 confirms that an object indicated by the selected object selecting mark is selected.

If the object is selected, the controller 290 controls display of a GUI to select the voice tone of the selected object (S650).

Figure 16:
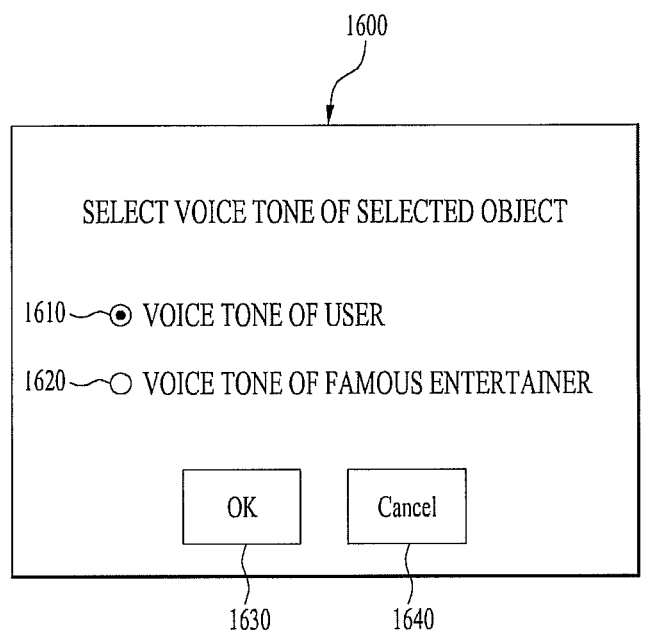
FIG. 16 is a view illustrating an exemplary embodiment of a screen on which a GUI to select the voice tone of an object is displayed.

FIG. 16 is a view illustrating an exemplary embodiment of a screen on which a GUI to select the voice tone of an object is displayed.

Referring to FIG. 16, the display 250 may display a GUI 1600 in operation S650. The GUI 1600 may be displayed to overlay a broadcast screen, or may be displayed over the entire screen or on a partial screen.

The GUI 1600 includes a radio button 1610 to select the voice tone of a user, a radio button 1620 to select the voice tone of a famous entertainer, an 'OK' button 1530 and a 'Cancel' button 1640.

Figure 17:
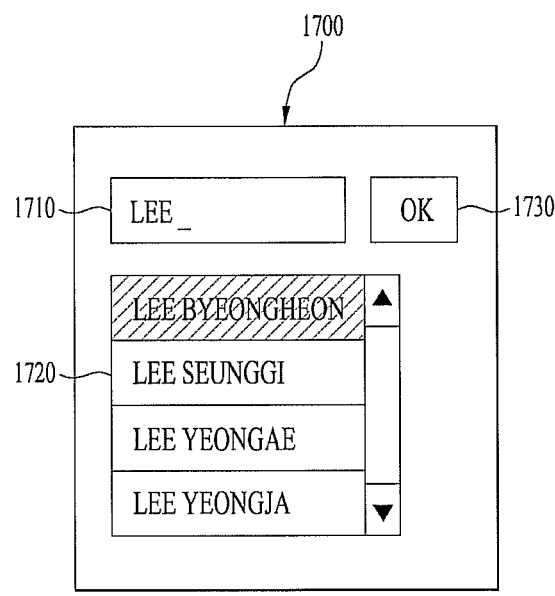
FIG. 17 is a view illustrating an exemplary embodiment of a screen on which a GUI to select an entertainer is displayed.

FIG. 17 is a view illustrating an exemplary embodiment of a screen on which a GUI to select an entertainer is displayed.

Referring to FIG. 17, if the radio button 1620 of FIG. 16 is selected, the controller 290 may control display of a GUI 1700. The GUI 1700 includes an input window 1710, a list box 1720 and an 'OK' button 1730. The user may directly input the name of an entertainer, who has desired voice tone, into the input window 1710 and may select an entertainer who has desired voice tone from the list box 1720. The user may complete selection of the entertainer by clicking the 'OK' button 1730.

The controller 290 detects a user action of requesting change in the voice tone of the selected object (S660). In some embodiments, if the 'OK' button 1630 is pressed in a state in which the radio button 1610 of FIG. 16 is selected, the controller 290 detects a user action of requesting change of the voice tone of the selected object to the voice tone of a user. That is to say, the user action indicates the voice tone of a user.

In some embodiments, if the 'OK' button 1730 of FIG. 17 is pressed, the controller 290 detects a user action of requesting the voice tone of the selected object to the voice tone of the entertainer selected in FIG. 17. That is to say, the user action indicates the voice tone of the entertainer selected in FIG. 17.

The controller 290 controls change from the voice tone of the object to the voice tone indicated by the user action in response to the detected user action (S670). That is to say, in operation S670, the voice of the object included in the content displayed in operation S610 is changed to the voice tone indicated by the user action detected in operation S660.

In some embodiments, the controller 290 may store voice tone, which is indicated by the user action, as a voice tone setting value in the storage unit 280. The voice tone setting value may be stored in association with an object identification value, which identifies an object, and a content identification value which identifies content displayed in operation S610. When the content displayed in operation S610 is again reproduced, the controller 290 may control change and display of the voice tone of the object, which is indicated by the object identification value associated with the voice tone setting value, according to the voice tone setting value.

In some embodiments, among audio data of content displayed in operation S610, the controller 290 may change audio data, which provides the voice of the object selected in operation S640, to audio data which provides the voice indicated by the user action.

Figure 18:
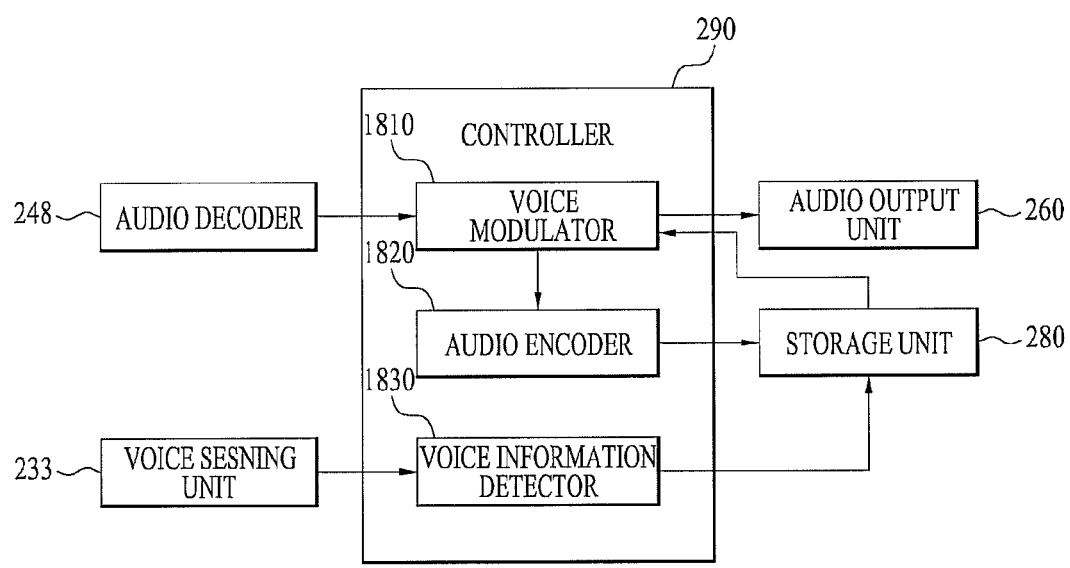
FIG. 18 is a block diagram illustrating the configuration of a controller in accordance with an exemplary embodiment of the present invention.

FIG. 18 is a block diagram illustrating the configuration of a controller in accordance with an exemplary embodiment of the present invention.

Referring to FIG. 18, the controller 290 may include a voice modulator 1810, a voice encoder 1820 and a voice information detector 1830.

The voice modulator 1810 modulates a voice signal output from the audio decoder 248 based on voice characteristics information. The voice characteristics information is information on components of voice. The voice characteristics information may include at least one of information indicating Sound Pressure Level (SPL), tone frequency information, tone color information, spectral flatness information and envelope information. Additionally, the voice characteristics information may include user's voice characteristics information and entertainer's voice characteristics information. The user's voice characteristics information is information on components of user's voice and the entertainer's voice characteristics information is information on components of entertainer's voice.

If a user action of selecting the radio button 1610 of the GUI 1600 is detected, the voice modulator 1810 may access the user's voice characteristics information in the storage unit 280 and may modulate a voice signal based on the accessed user's voice characteristics information. For example, the voice modulator 1810 may modulate a tone frequency of the voice signal to a tone frequency indicated by tone frequency information included in the user's voice characteristics information, may modulate a tone color of the voice signal to a tone color indicated by tone color information included in the user's voice characteristics information, and may modulate a sound pressure level of the voice signal to a sound pressure level indicated by SPL information included in the user's voice characteristics information.

Additionally, if a user action of requesting change to the voice tone of a specific entertainer is detected, the voice modulator 1810 may access entertainer's voice characteristics information on the specific entertainer in the storage unit 280 and may modulate a voice signal based on the accessed entertainer's voice characteristics information.

The voice modulator 1810 may provide the modulated voice signal to the voice output unit 260 and may provide the modulated voice signal to the audio encoder 1820.

The audio encoder 1820 may compress the voice signal output from the voice modulator 1810 and may store the compressed voice signal in the storage unit 280.

The voice information detector 1830 receives the user's voice detected by the voice sensing unit 233 and detects components of the received user's voice. That is to say, the voice information detector 1830 may detect at least one of sound pressure level, tone frequency, tone color, spectral flatness and envelope of the user's voice. The voice information detector 1830 may produce user's voice characteristics information indicated by the detected voice component and may store the produced user's voice characteristics information in the storage unit 280.

Figure 19:
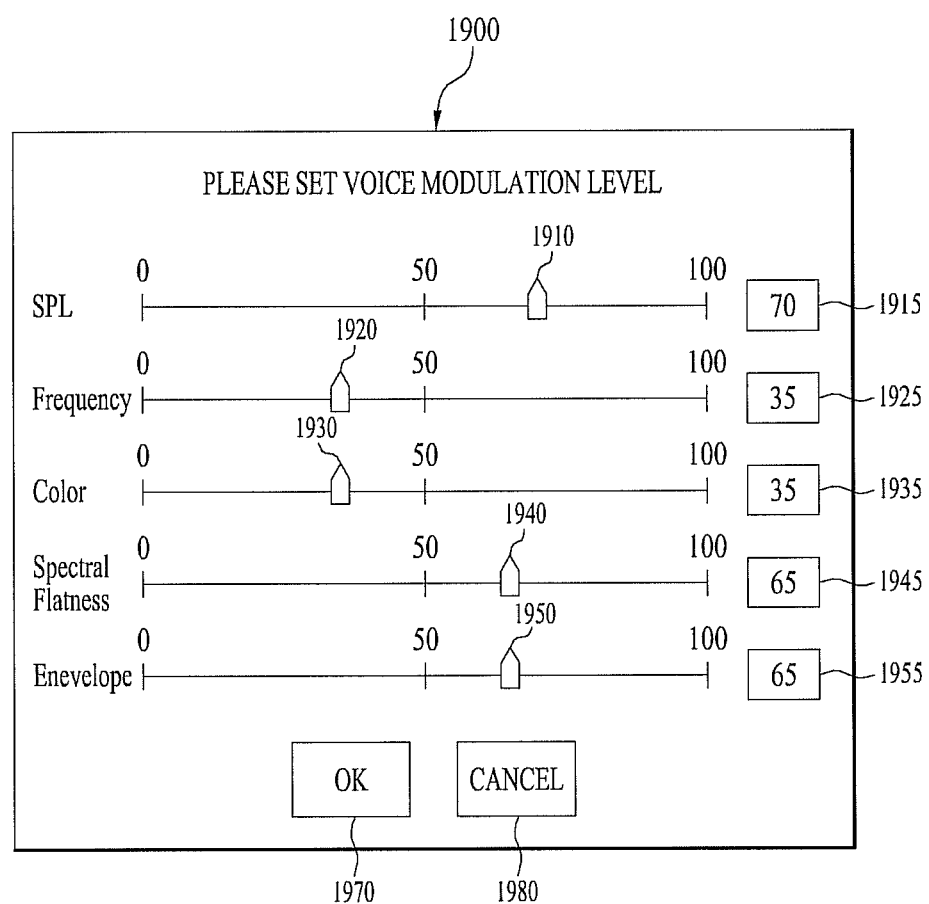
FIG. 19 is a view illustrating an exemplary embodiment of a screen on which a GUI to set a voice modulation level is displayed.

FIG. 19 is a view illustrating an exemplary embodiment of a screen on which a GUI to set a voice modulation level is displayed.

Referring to FIG. 19, the display 250 may display a GUI 1900 to set a voice modulation level. The controller 290 may detect a user action of requesting setting of the voice modulation level and may control display of the GUI 1900 in response to the detected user action.

The GUI 1900 includes an indicator 1910 to adjust an SPL, an indicator 1920 to adjust a tone frequency level, an indicator 1930 to adjust a tone color level, an indicator 1940 to adjust a spectral flatness level, and an indicator 1950 to adjust an envelope level. The GUI 1900 includes input windows 1915, 1925, 1935, 1945 and 1955 to display the respective levels indicated by the indicators 1910, 1920, 1930, 1940 and 1950 and further includes an 'OK' button 1970 and a 'Cancel' button 1980.

When the GUI 1900 is initially displayed, the indicators 1910, 1920, 1930, 1940 and 1950 may be located at positions corresponding to levels indicated by SPL, musical interval, tone color, spectral flatness and envelope information included in the voice characteristics information. The voice characteristics information may be user's voice characteristics information or entertainer's voice characteristics information. If the user action of selecting the radio button 1610 of FIG. 16 is selected in operation S660, the voice characteristics information may be user's voice characteristics information. If the user action of selecting a specific entertainer via the GUI 1700 of FIG. 17 is detected, the voice characteristics information may be voice characteristics information of the selected entertainer.

The user may perform a user action of indicating adjustment of a corresponding voice component level by dragging one of the indicators 1910, 1920, 1930, 1940 and 1950. The controller 290 may detect the user action and may change a corresponding voice component level based on the level indicated by the indicator that is moved by the user action. The indicators 1910, 1920, 1930, 1940 and 1950 are moved by a dragged length. For example, if the user drags the indicator 1910 to a position corresponding to the level of 35, the indicator 1910 is moved to the position corresponding to the level of 35. The controller 290 changes an SPL level based on the level of 35 indicated by the moved indicator 1910.

The GUI 1900 may be displayed during display of content. In this case, if the user drags one of the indicators 1910, 1920, 1930, 1940 and 1950, the controller 290 may change a voice component level associated with the dragged indicator based on a level indicated by the dragged indicator and the voice of content may be modulated to the changed voice component level. For example, if the user drags the indicator 1920 to a position corresponding to the level of 65, the controller 290 changes a tone frequency level based on the level of 65 and the tone frequency of content that is being reproduced may be modulated the changed tone frequency level.

If the user performs a user action of pressing the 'OK' button 1970, the SPL information, tone frequency information, tone color information, spectral flatness information and envelope information included in the voice characteristics information are changed in level based on the respective levels displayed on the input windows 1915, 1925, 1935, 1945 and 1955 and the GUI 1900 disappears from the screen. If the user performs a user action of pressing the 'Cancel' button 1980, the GUI 1900 disappears from the screen without change of the voice characteristics information.

The present invention may be implemented as code that can be written on a computer-readable recording medium and can thus be read by a computer. The computer-readable recording medium includes all types of recording devices in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer devices connected through a network so that computer-readable code is written thereto and executed therefrom in a decentralized manner.

As is apparent from the above description, through provision of a display device and a method for providing content using the display device in accordance with the present invention, a user can search for a video frame and audio contained in content. More particularly, the user can search for a video frame corresponding to a scene where a particular character comes along without directly seeing the video frame and can also search for a video frame and audio of content that is stored in another device. Moreover, it is possible to search for a desired video frame and audio at a time rather than performing retrieval on a per device basis. Since the searched results may be provided in the form of thumbnails and a video frame and audio associated with the selected thumbnail may be directly displayed, the user can easily select and edit the searched video frame and audio.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for providing content using a display device, the method comprising:
    constructing a content information database;
    receiving a user input;
    searching for at least one content including a video frame associated with a search term included in the received user input in the content information database; and
    displaying a list of the searched content,
    wherein constructing the content information database includes
        accessing content,
        extracting a video frame from the accessed content,
        checking whether or not the extracted video frame satisfies requirements of a key frame, the requirements of the key frame including whether the extracted video frame corresponds to a scene change in the accessed content,
        selecting the video frame as the key frame if the video frame satisfies the requirements of the key frame, and
        producing image information associated with the selected video frame.

2. The method according to claim 1, further comprising editing content included in the list of the searched content.

3. The method according to claim 2, wherein the editing includes at least one of:
    replacing a video frame of the content with another video frame;
    dubbing voice to the content;
    varying a voice level of at least a part of audio data included in the content; or
    replacing at least a part of audio data included in the content with previously stored audio data.

4. The method according to claim 1, wherein the content is stored in at least one of a global resource or a local resource.

5. The method according to claim 1, wherein the displayed list includes a thumbnail corresponding to the video frame.

6. The method according to claim 5, further comprising:
    detecting a selection of the thumbnail; and
    displaying a video frame associated with the selected thumbnail.

7. The method according to claim 1, further comprising:
    detecting a selection of content included in the list; and
    displaying a thumbnail of a video frame associated with the search term among video frames included in the content.

8. The method according to claim 1, wherein the searching for the content includes searching for the video frame associated with the search term using the content information database including image information with respect to the video frame included in the content.

9. The method according to claim 1, wherein the producing image information includes producing image information using information included in a visual descriptor of the content.

10. The method according to claim 1, wherein the content information database further includes position information of the video frame and information to associate the position information of the video frame with the image information.

11. The method according to claim 1, wherein the image information includes at least one of characteristics information on the video frame, subjective information on the video frame or expository information on the video frame.

12. The method according to claim 1, wherein producing the image information includes at least one of:
    analyzing objective information on the selected video frame,
    analyzing subjective information on the selected video frame, or
    analyzing expository information on the selected video frame.

13. The method according to claim 1, wherein constructing the content information database further includes storing the produced image information to be indexed based on at least one of the image information.

14. The method of claim 1, wherein the extracted video frame is determined to be a key frame when a change rate in the extracted video frame between a prescribed video frame and a previous video frame is greater than or equal to 50%.

15. The method of claim 1, wherein at least one image in the content is configured to be selectable, and the user input is a selection of the at least one image in the displayed content to search for key frames associated with the selected image.

16. The method of claim 1, wherein the controller receives a selection of a content displayed in the list, displays a video frame corresponding to the selected content, selects a prescribed voice for audio in the selected video frame, and changes a voice in the selected content to the selected voice.

17. A display device comprising:
    a controller to receive a search term and search for at least one content including a video frame associated with the received search term in the content information database; and
    a display to display a list of the searched content,
    wherein the controller is configured to construct the content information database by accessing content, extract a video frame from the accessed content, check whether or not the extracted video frame satisfies requirements of a key frame, select the video frame as the key frame when the video frame satisfies the requirements of the key frame, and produce image information associated with the selected video frame, and
    wherein the controller is configured to receive a selection of a content displayed in the list, display a video frame corresponding to the selected content, select a prescribed voice for audio in the selected video frame, and change a voice in the selected content to the selected voice.

18. The display device according to claim 17, wherein the controller is configured to edit content included in the list of the searched content.

19. The display device according to claim 17, wherein the controller is further configured to store the produced image information to be indexed based on at least one of the image information.

* * * * *